March 20, 1962

O. M. STANLEY 3,025,651

CHECK-OUT COUNTERS

Filed Nov. 12, 1959

INVENTOR.
OSCAR M. STANLEY

BY
Curtis, Morris & Safford
ATTORNEYS

INVENTOR.
OSCAR M. STANLEY
BY
Curtis, Morris & Safford
ATTORNEYS

March 20, 1962 O. M. STANLEY 3,025,651
CHECK-OUT COUNTERS
Filed Nov. 12, 1959 5 Sheets-Sheet 3

INVENTOR.
OSCAR M. STANLEY
BY
Curtis, Morris & Safford
ATTORNEYS

March 20, 1962 O. M. STANLEY 3,025,651
CHECK-OUT COUNTERS
Filed Nov. 12, 1959 5 Sheets-Sheet 4

INVENTOR.
OSCAR M. STANLEY
BY
Curtis, Morris & Safford
ATTORNEYS

March 20, 1962 — O. M. STANLEY — 3,025,651
CHECK-OUT COUNTERS
Filed Nov. 12, 1959 — 5 Sheets-Sheet 5
FIG. 9
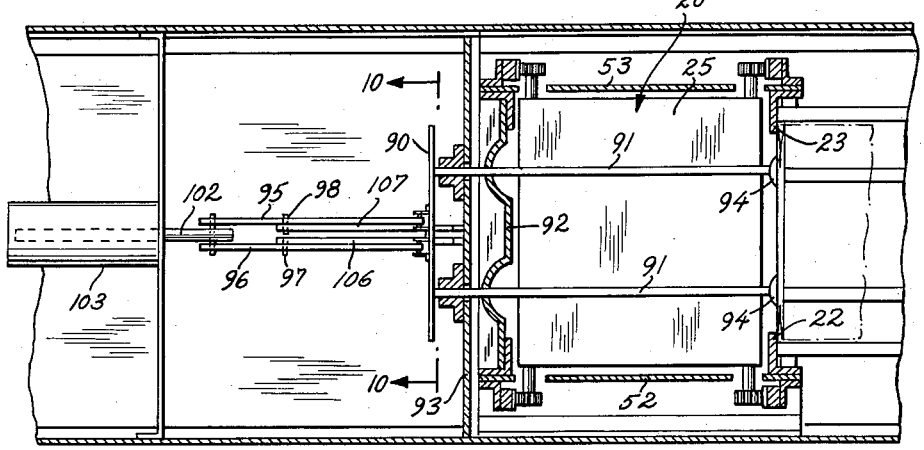
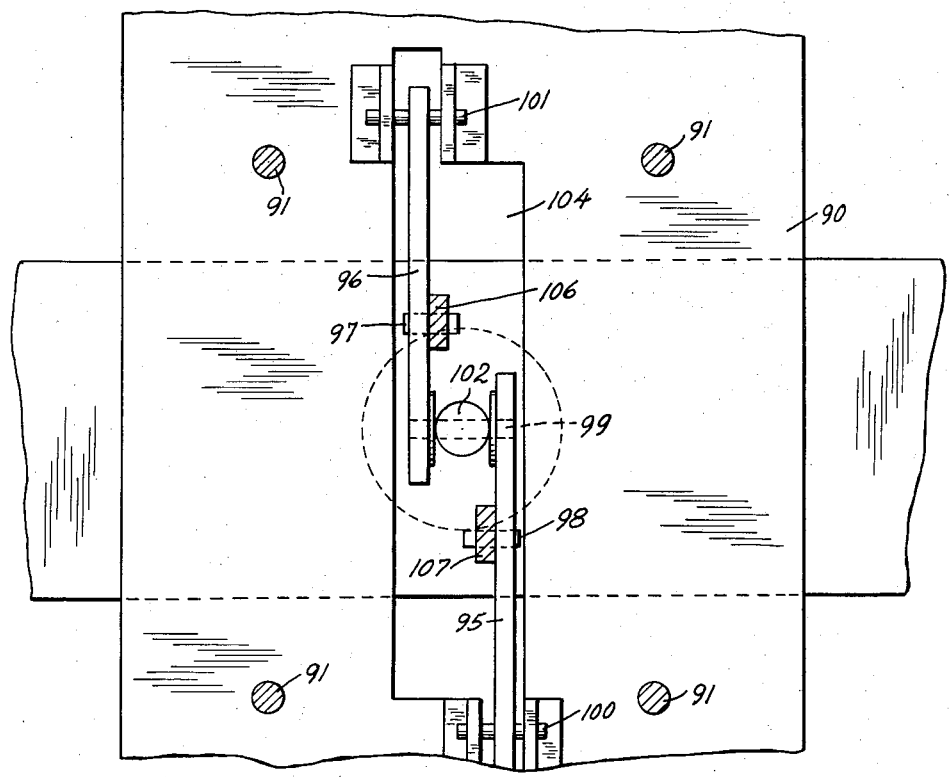
FIG. 10
INVENTOR.
OSCAR M. STANLEY
BY
Curtis, Morris & Safford
ATTORNEYS United States Patent Office 3,025,651
Patented Mar. 20, 1962

3,025,651
CHECK-OUT COUNTERS
Oscar M. Stanley, 370 1st Ave., New York, N.Y.
Filed Nov. 12, 1959, Ser. No. 852,366
4 Claims. (Cl. 53—384)

The present invention relates to check-out counters used in markets and more particularly to apparatus which facilitates the operation of checking articles and packing them in bags.

In recent years the self-service market has replaced prior methods of merchandising because it saves time and labor and, therefore, is more economical. In a self-service market the customer selects the articles desired from shelves and places them in a cart in which they are conveyed to a check-out counter. The articles are then placed on one section of the counter where an attendant tallies each article on a cash register and slides it to another section of the counter as it is checked. After all of the articles have been tallied, they are packed in bags which may be done by the attendant who tallies the articles, or by another attendant.

The checking-out and packing operations are time consuming and constitute a bottle-neck in the self-service system of merchandising. As a result, a number of customers may have to stand in line and wait before their merchandise is check-out and packaged. Thus, any way of decreasing the time and labor required in the check-out operation would materially increase the efficiency of the system, reduce the cost of operation and please the customers.

One of the objects of the present invention is to provide an improved construction in a check-out counter which adapts articles to be packed directly into a bag as they are tallied and thereby eliminates the separate operation of checking and packing the articles.

Another object is to feed bags to the open side of a well in the check-out counter where they may be easily withdrawn and opened in the well below the top of the counter, packed with articles as they are checked and thereafter raised to the level of the counter.

Another object is to provide an elevator platform of novel construction which may be raised and lowered to any desired position that is most convenient for a particular individual in packing articles as they are checked.

Another object is to provide an apparatus of the type indicated in which the feeding and opening of the bags into a well below the top of the counter and the raising of filled bags is performed mechanically by manually controlled mechanism.

Still another object is to provide an apparatus of the type indicated which is of simple and compact construction, economical to manufacture and one which is foolproof and reliable in operation without danger to the attendant.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 9 is a plan view taken on line 9—9 of FIGURE 8; and

FIGURE 10 is a transverse sectional view taken on line 10—10 of FIGURE 9 to show the toggle links of the bag removing and opening mechanism.

Figure 1:
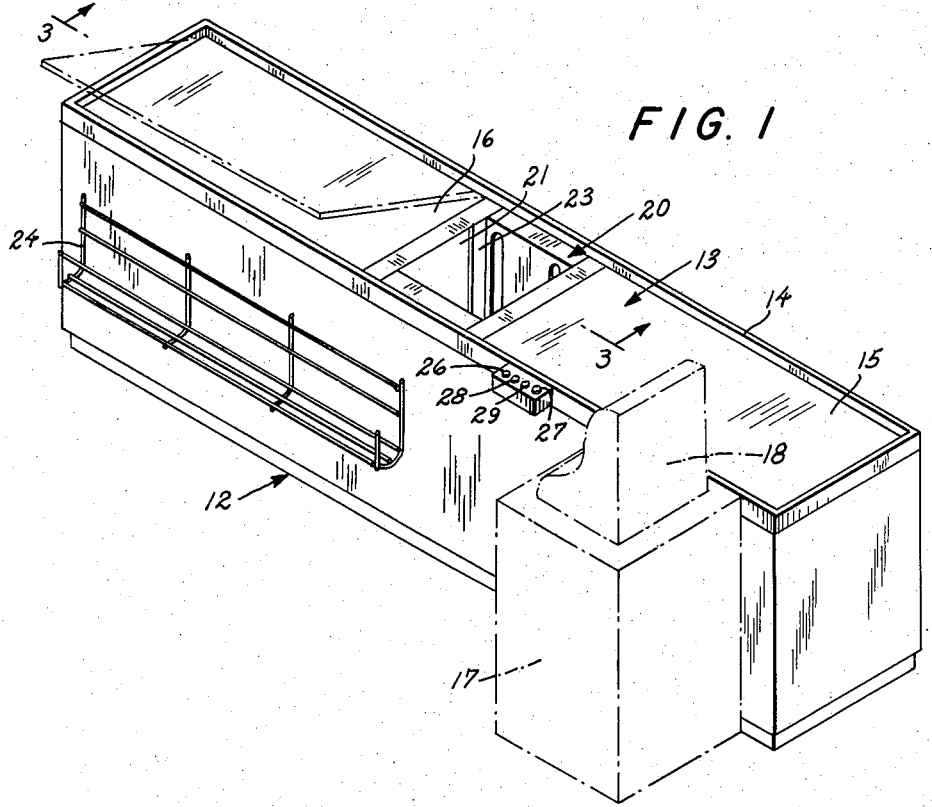
FIGURE 1 is a perspective view of a check-out counter incorporating the novel features of the present invention.

FIGURE 1 of the drawings illustrates a check-out counter 12 for a market which incorporates the novel features of the present invention. The counter 12 has a flat top 13 with an upwardly projecting rail 14 around its periphery and comprises a section 15 on which articles are placed to be checked and a section 16 for filled bags of the checked articles. At one side of the section 16 is a stand 17 for mounting a cash register 18. The attendant stands adjacent the section 15 of counter 12 and the cash register 18 to tally the purchased items on the register. As thus far described, the counter 12 is of conventional construction.

In accordance with the present invention, a well 20 is provided in the check-out counter 12 between the sections 15 and 16 in which opened bags are placed with the upper ends adjacent the flat top 13 to adapt articles to be packed directly into the open bags as they are tallied on the cash register 18. To further facilitate the operation of checking out merchandise, a stack of bags B is mounted in the counter 12 below the flat top 13 and the bags are automatically fed to position the foremost bag of the stack at the open side 21 of the well 20. The foremost bag of a stack is retained at the open side 21 of the well by detent plates 22 and 23 at opposite edges of the open side 21, see FIGURES 1, 3 and 4, from which the bag may be easily withdrawn and opened in the well 20. A supply of bags B may be mounted under one or the other of the sections 15 and 16 of the flat top 13 or under both sections which are hinged to swing upwardly as illustrated in FIGURE 1. A rack 24 is mounted on the inner side of counter 12 for bags of other sizes than those in the stacks under the counter sections 15 and 16.

The open bags are supported in the well 20 on an elevator platform 25, see FIGURES 2 to 5, which may be lowered to receive empty bags and raised to lift filled bags to the level of the flat top 13 of the counter where they are slid onto section 16. The raising and lowering of the elevator platform 25 is manually controlled as by the pushbutton switches 26 and 27 at the side of the counter as shown in FIGURE 1. In addition, lights 28 and 29 are provided to indicate when the elevator is in operative condition and when the supply of bags B is low.

Figure 2:
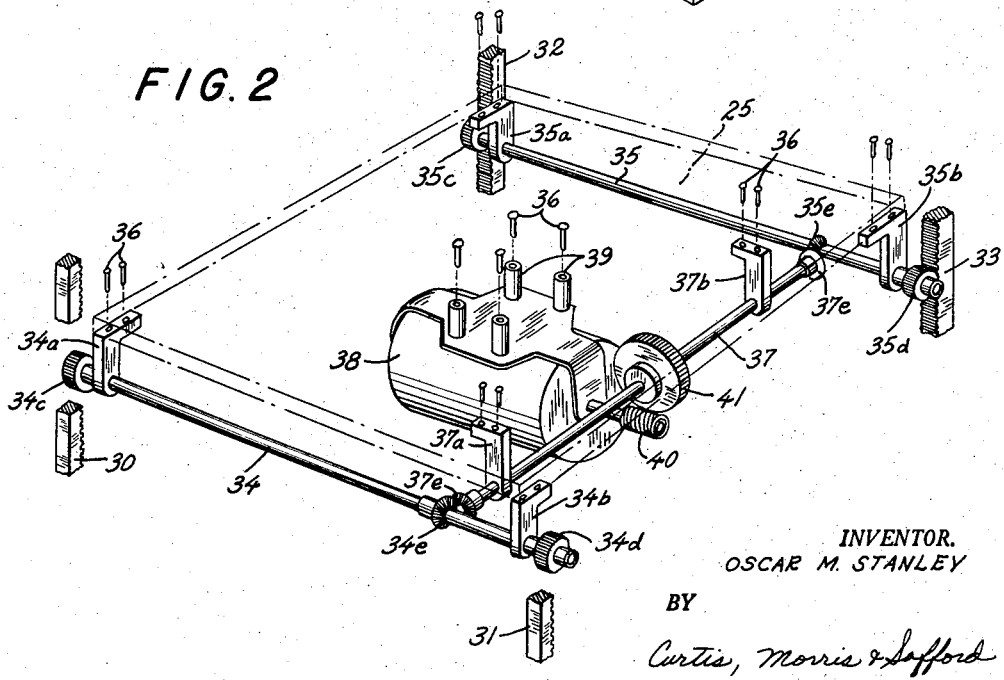
FIGURE 2 is a diagrammatic view in perspective showing the operating mechanism for the elevator platform.

The elevator platform 25 is of a unique construction, as illustrated diagrammatically in FIGURE 2. Elevator platform 25 is supported on pairs of racks 30, 31 and 32, 33 mounted at opposite sides of the well 20 at each corner with racks 30 and 32 and 31 and 33 opposing each other, respectively. Parallel shafts 34 and 35 are mounted on the platform 25 at opposite side edges by means of bearing brackets 34a, 34b and 35a, 35b attached to the underside of the platform by bolts 36.

Figure 6:
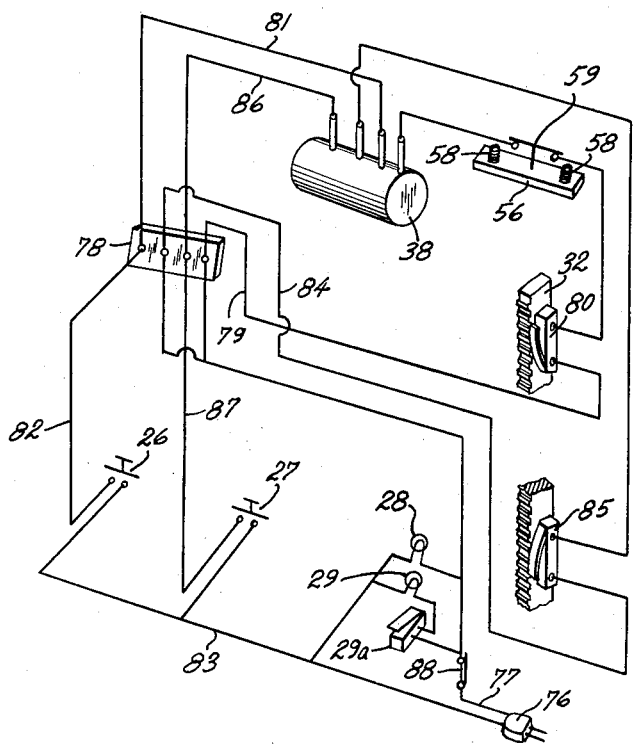
FIGURE 6 is a diagrammatic view of the electric circuit for controlling the elevator platform.

Each shaft 34 and 35 has ends projecting beyond the platform 25 and on which pinion gears 34c, 34d and 35c, 35d are fixedly mounted to mesh with the racks 30, 31 and 32, 33, respectively. It will be observed in FIGURE 2 that when the shafts 34 and 35 are rotated at the same rate in opposite directions the pinions will climb up or down the opposing racks. The shafts 34 and 35 are rotated synchronously in opposite directions by a counter-shaft 37 journaled in brackets 37a and 37b attached to the underside of the elevator platform 25 by bolts 36. Counter-shaft 37 has beveled gears 37e at its opposite ends which mesh with beveled gears 34e and 35e fast on the shafts 34 and 35, respectively, to drive said shafts in opposite directions. Counter-shaft 37 is driven by an electric motor 38 attached to the bottom of the elevator platform 25 by spacers 39 and bolts 36 and the motor drives the counter-shaft through a worm 40 on the motor shaft and wheel 41 on the counter-shaft. The electric motor 38 is a reversible type, and for purposes of illustration, is shown in FIGURE 6 as having separate leads for reversible windings. Thus, the elevator platform 25 may be raised by pressing the push button 26, see FIGURE 1, or lowered by pressing the push button 27 and is locked by the worm and wheel 40 and 41 in any vertical position in well 20.

Figure 3:
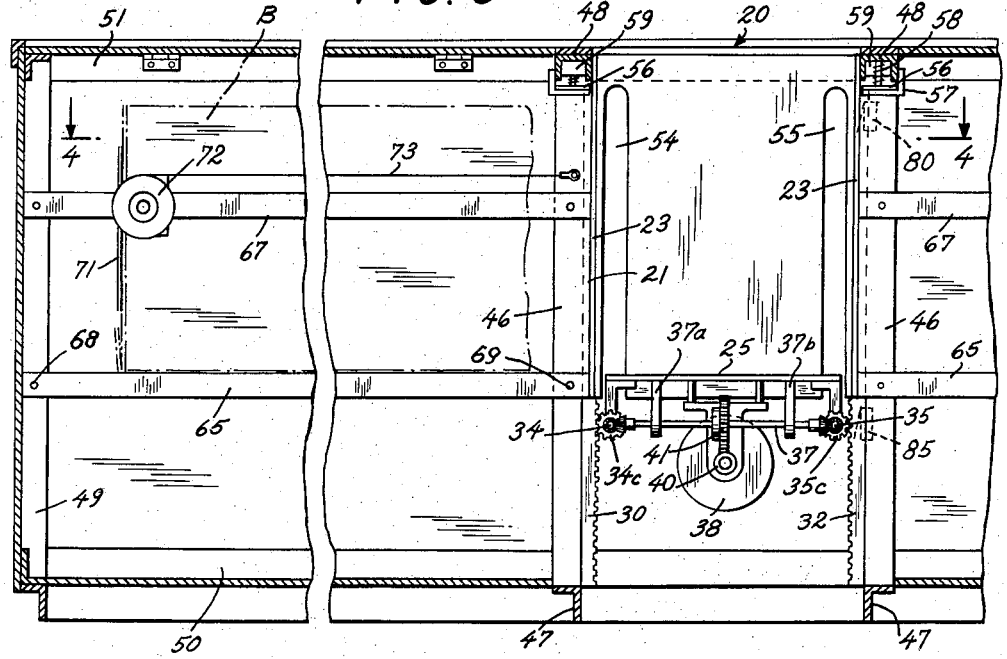
FIGURE 3 is a sectional view on line 3—3 of FIGURE 1 and showing the mechanism at one side of the elevator platform for feeding bags toward the open side of the well.
Figure 4:
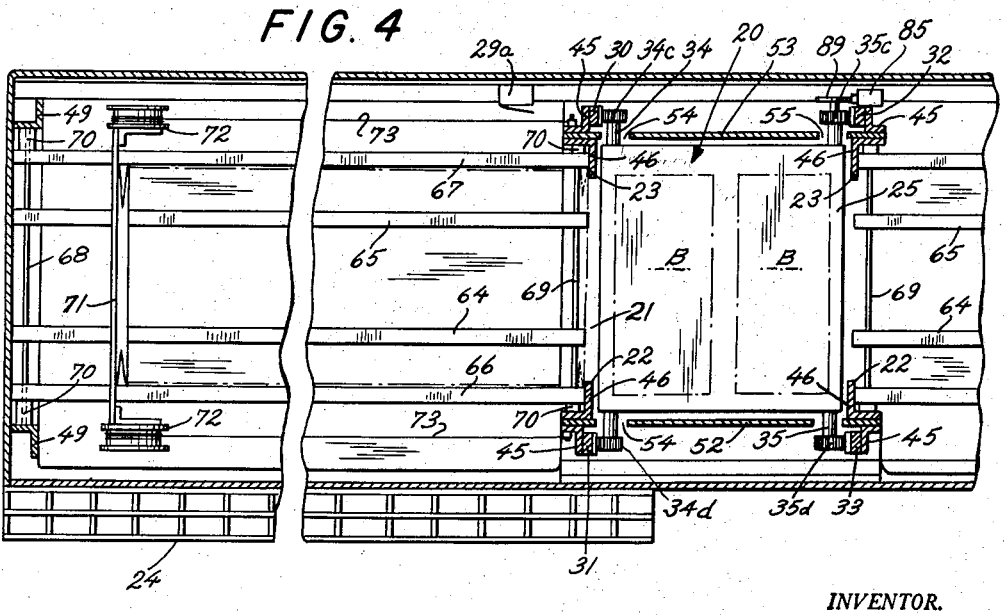
FIGURE 4 is a sectional plan view taken on line 4—4 of FIGURE 3 and showing the detent plates at the open side of the well for holding the foremost bag of a stack and the spring motors and pusher for feeding the stack of bags.

As shown in FIGURES 3 and 4, each rack 30 to 33 is mounted on an angle iron bracket 45 which, in turn, is connected to an angle iron stanchion 46 at each corner of the well 20. As will be observed by reference to FIGURE 4, the inner edges of each pair of angle iron stanchions 46 constitute the detent plates 22 and 23 for retaining bags. The stanchions 46 extend between cross beams 47 and 48 constituting a part of the frame of the check-out counter. As shown in FIGURE 3, each cross beam 47 is in the form of an angle iron which sets on the floor while each cross beam 48 is in the form of channel. Similar upright corner stanchions 49 are provided at the corners of the counter 21 and are connected by horizontally extending beams 50 and 51. Two sides of the well 20 are closed by closure plates 52 and 53 each having slots 54 and 55 through which the shafts 34 and 35 project between the platform 25 and pinions 34c, 34d and 35c, 35c, respectively. The opposite sides of the well 20 longitudinally of the counter 12 are open between the detent plates 22 and 23 formed as the ends of opposed pairs of the spaced upright stanchions 46.

To prevent the elevator 25 from jamming the fingers of an attendant between it and the cross-beam channels 48, safety switch operating rails 56 are provided. Each rail 56 is supported under its channel 48 by brackets 57 and is yielding held in spaced relation to the channel by springs 58. Mounted in the channels 48 are normally closed switches 59 operated to open position by movement of the rails 56. The switches are preferably of the micro switch type which are operated by a slight movement.

Figure 5:
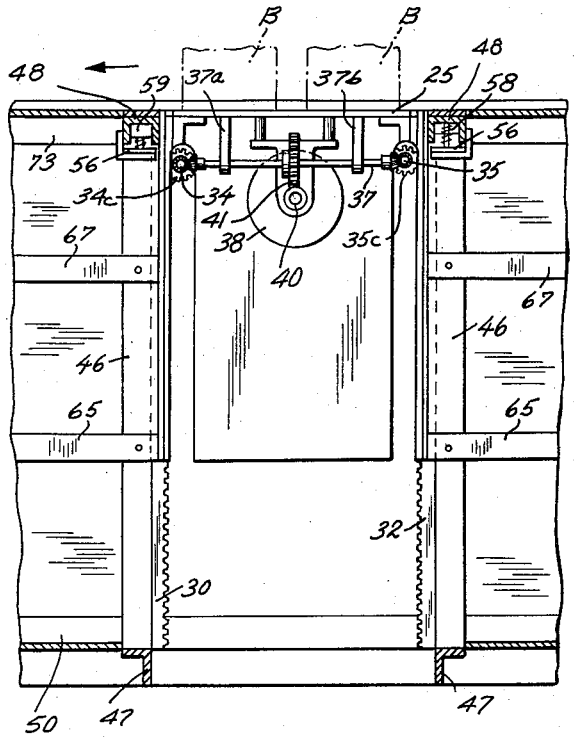
FIGURE 5 is a view similar to FIGURE 3 showing the elevator platform in raised position to discharge filled bags.

As shown in FIGURES 3 and 4, the counter 12 is provided with spaced bottom rails 64 and 65 and spaced side rails 66 and 67 for mounting a stack of bags below the flat top 13. Bottom rails 64 and 65 are supported on rods 68 and 69 at each end extending between the corner stanchions 49 of the counter frame and stanchions 46 at the open side of the well. The side rails 66 and 67 are also bolted to the stanchions 46 and 49 with suitable spacers 70 therebetween. Thus, the bottom of each bag of a stack is supported by the bottom rail 64 and 65 and held between the side rails 66 and 67. A pushing element 71 is mounted to slide on the side rails 66 and 67 and has a spring motor 72 at each end in the form of a reel for reeling tape. Tapes 73 have one end connected to the stanchions 46 at the open side of the well and the opposite ends are connected to the reels of the spring motors 72. Thus, the pushing element 71 is yieldingly advanced toward the open side of the well 20 by the spring motors 72 to feed a stack of bags toward the well 20. As illustrated in FIGURE 4, the side edges of the foremost bag of a stack overlie the detent plates 22 and 23 to retain the bag adjacent the open side of the well. Thus, when the elevator platform 25 is lowered to the position illustrated in FIGURE 3, an attendant may easily and quickly remove and open a bag onto the elevator platform 25 by merely inserting his hand between the sides of the bag and moving it outwardly. As the first side of the bag slips by the detent plates 22 and 23, the opposite side of the gusseted bag is detained by the detent plates so that the bag opens as it is moved into the well 20. Preferably, the elevator platform 25 is of a size to hold two bags in open position. When the bags have been filled with merchandise packed directly into the bags as it is checked out, the elevator 25 is operated by pressing switch 26 to raise the filled bags to the level of the flat top 13 of the counter, as illustrated in FIGURE 5.

The electric circuit for controlling the operation of the elevator platform 25 is illustrated in FIGURE 6 as comprising a plug 76 adapted to be inserted in an electric outlet box of a power line and having one terminal connected through a line 77 to two terminals of a terminal block 78. One branch 79 from line 77 extends through a limit switch 80 on one of the racks 32 and then through the safety switch 59 to one terminal of the motor 38 constituting one end of a winding for rotating the motor to raise platform 25. The other terminal of the motor winding is connected by a line 81 to the terminal block 78 and then through line 82 to push button switch 26 and line 83 to the other terminal of the plug 76. Similarly, another branch 84 from line 77 is connected to a limit switch 85 to one terminal of another winding of motor 38 for reversing the motor to lower the platform 25. A line 86 extends from the other terminal of the reversing winding to terminal block 78, a line 87 connecting the block to push button switch 27 and the circuit is completed through line 83 to the other terminal of the plug. Limit switches 80 and 85 are positioned to be operated by a projection on the elevator platform 25 and in FIGURE 4, the limit switches are shown mounted on rack 32 and the projection is shown as a disk 89 on an extension of shaft 35 which rolls over the switch actuator. A line switch 88 is provided in line 77 and a light 28 is connected between the lines 77 and 83 beyond the line switch to indicate that the electric circuit for the elevator platform 25 is energized and in condition for operation. In parallel with light 28 is a branch circuit across the line including light 29 and a normally open switch 29a operated by pusher 71 when the supply of bags is low, see FIGURE 4.

During normal operation of the check-out counter 12 illustrated in FIGURE 1, a customer places the articles to be purchased on the section 15 of the counter. The attendant presses the push button 27 which operating through the electric circuit, illustrated in FIGURE 6, energizes one of the windings of the motor 38 to rotate the counter-shaft 37 and parallel lay shafts 34 and 35. Pinion gears 34c, 34d and 35c, 35d on shafts 34 and 35 then rotate in meshing engagement with racks 30, 31 and 32, 33 to lower the platform 25 to the position illustrated in FIGURE 3. The attendant then inserts his hand between the sides of the foremost bag at either open side of the well 20 and merely pulls the side of the bag outwardly toward the well to open the bag directly into the well where it rests on the elevator platform 25. For example, one bag can be withdrawn from each side of the well. The bags may be positioned at any level desired by the attendant by pressing the proper button 26 or 27 to raise or lower the platform 25. In any case, the greater portion of the bag will be positioned in the well so that articles may be easily and quickly packed in the bag from the level of the flat top 13 of the counter.

The attendant then takes each item from section 15 of counter 12 and tallies it on the cash register 18 after which he packs the article directly into one or the other of the open bags. When the entire order has been tallied and packed or when the bags have become filled, the attendant pushes the up button 26 which raises the elevator platform 25 to the lever of the flat top 13 of the counter, as shown in FIGURE 5, where the filled bags may be slid onto the section 16 of the counter for removal by the customer. The limit switches 80 and 85 are operated by the elevator platform 25 to limit both the upward and downward movement of the elevator platform. However, the platform may be located at any desired position between the upper and lower limits and will be held locked in any adjusted position by the worm 40 and wheel 41 of the elevator drive.

Whenever the supply of bags at the open side of well 20 becomes depleted, the pusher 71 actuates the switch 29a, see FIGURE 4, which puts on the light 29, see FIGURE 1, to indicate that a new supply of bags should be provided. The section 15 or 16 of the counter 12 is then raised as indicated in FIGURE 1, the pusher 71 retracted and the bags placed in front of the pusher.

Figure 7:
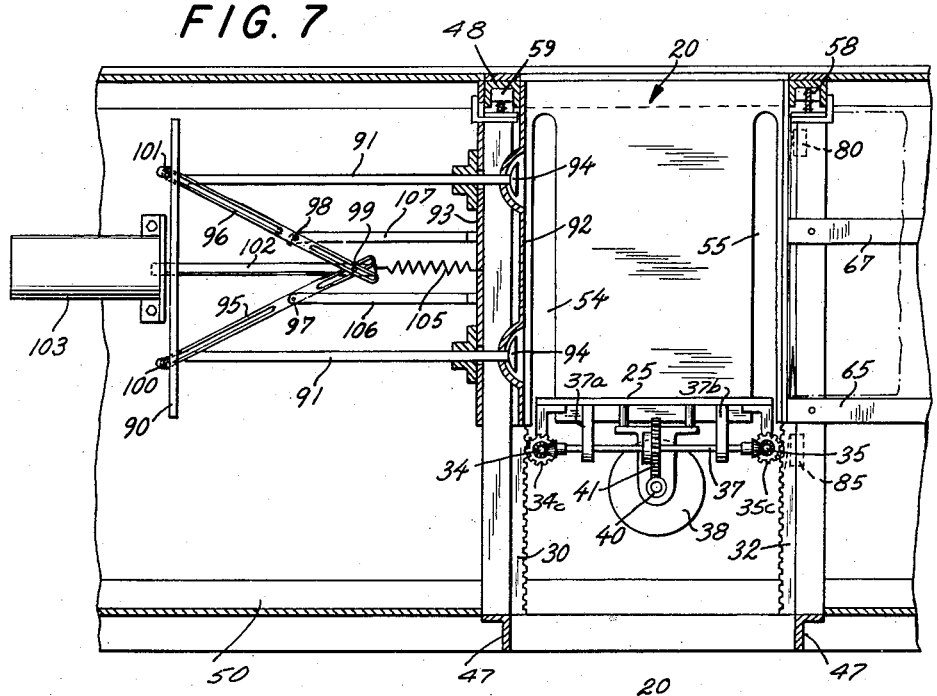
FIGURE 7 is a sectional view similar to FIGURE 3 illustrating an automatic bag feeding and opening mechanism in its retracted position.
Figure 8:
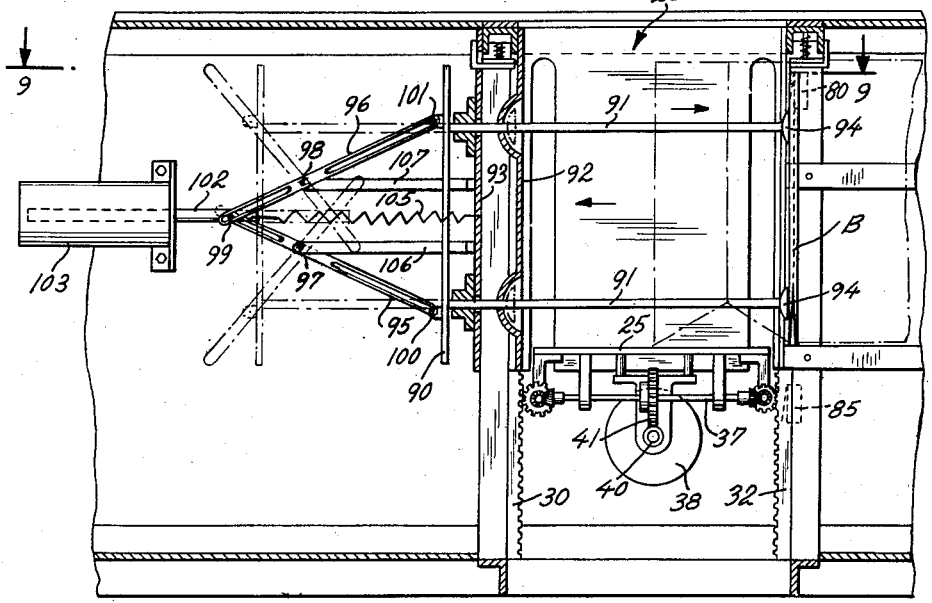
FIGURE 8 is a view similar to FIGURE 7 showing the bag opening means actuated to engage a bag to remove it from the storage compartment into the well.

FIGURES 7 to 10 inclusive illustrate a modified construction in which bags may be withdrawn and opened automatically by manually controlled mechanism. The construction at one open side of the well 20 is identical with that previously described and the automatic bag opening mechanism is provided at the other side of the well. In the illustrated embodiment, the bag opening mechanism comprises a plate 90 having a plurality of spaced rods 91 projecting therefrom through bearings in a pair of spaced closure plates 92 and 93 at the side of the well 20 opposite the open side to which the bags are fed. A head 94 is provided at the end of each rod 91 having gripping means for gripping engagement with the flat sides of the bag. Any suitable gripping means may be provided, such as permanent magnets, which cooperate with iron oxide particles which may be printed on the side of the bag at spaced spots corresponding to the position of the heads; suction cups which flatten against the side of the bag; vacuum cups connected to a source of pressure below atmospheric pressure; or the heads may have a tacky adhesive either fed to the head, or in the form of a tape movable on the head. In any of the head constructions 94, when the plate 90 and heads are moved from their position in recesses in the plate 92 into engagement with the foremost bag of a stack, as illustrated in FIGURE 8, the heads will grip the sides of the bag. When plate 90 and heads 94 are withdrawn the side of the bag will be withdrawn from the detent plates 22 and 23 which will open the bag in the manner illustrated in FIGURE 8 as the rearward side continues to be held by the detent plates. Preferably, the gusseted bags are folded in the manner illustrated in FIGURES 7 and 8 to illustrate the opening as one side is withdrawn. The opened bag will continue to be held by the heads 94 until the side of the bag engages the plate 92 and the heads continue to move into the recesses in the plate to detach the bag from the heads. When an automatic bag opening device is used the well 20 is made of a size to hold one bag.

Plate 90 with its attached rods 91 and heads 94 may be reciprocated by any suitable operating mechanism. In the illustrated embodiment the plate 90 is reciprocated by toggle links 95 and 96 pivotally mounted intermediate their ends on fixed pivot pins 97 and 98 with their inner ends pivotally connected by the pivot pin 99. The outer ends of the toggle links 95 and 96 are pivotally connected to transverse rods 100 and 101 illustrated at the rear of the plate 90 for purposes of illustration. The common pivot 99 is connected to one end of a plunger 102 of a solenoid 103 for movement from the position illustrated in FIGURE 7 to that illustrated in FIGURE 8. The plate 90 has a central opening 104 between rods 91, as illustrated in FIGURE 9, so that the linkage may pass therethrough. A spring 105 connects the common pivot 99 to the plate 93 to return the linkage from the position illustrated in FIGURE 8 to that illustrated in FIGURE 7 when the solenoid 103 is de-energized. It will be understood that energization of the solenoid 103 will be controlled by a push button switch on the counter similar to switches 26 and 27. As shown in FIGURES 9 and 10, the toggle links 95 and 96 are offset with respect to each other by the brackets 106 and 107 projecting from the plate 93 on which the toggle links are pivotally mounted to adapt the links to pass by each other.

Thus, when the automatic bag opener is used the attendant will push the button 27 to lower the elevator platform 25 to the position illustrated in FIGURES 7 and 8, and then press another button to energize the solenoid 103. Solenoid 103 then reciprocates the plunger 102 and rocks the toggle links 95 and 96 from the position illustrated in FIGURE 7 to that illustrated in FIGURE 8 to engage the heads 94 with the side of the foremost bag at the opposite side of the well. Upon release of the push button, the spring 104 operates the toggle links 95 and 96 to withdraw the foremost bag of a stack from the detent plates 22 and 23 and open the bag in the well 20. When the side of the bag engages the plate 92 it is separated from the heads 94 which continue to move away from the side of the bag in recesses in the plate. The attendant then checks the items on the cash register 18 and packs them directly into the open bag and when the bag is filled presses the up button 26 to raise the filled bag from the well 20.

It will now be observed that the present invention provides an improved construction in a check-out counter which eliminates the separate operations of checking and packing articles by adapting the articles to be packed directly into the bag as they are tallied on a cash register. It also will be observed that the improved construction provides for feeding bags to the open side of a well in a check-out counter where they may be easily withdrawn and opened into the well below the top of the counter. It also will be observed that the present invention provides an apparatus in which the feeding and opening of the bags into the well and the raising of filled bags may be performed mechanically by manually controlled mechanism. It will still further be observed that the present invention provides an apparatus which is of simple and compact construction adapted for economical manufacture and one which is fool-proof and reliable in operation without danger to the attendant.

While a single embodiment of the invention is herein illustrated and described, it will be understood that changes may be made in the construction and arrangement of elements without departing from the spirit or scope of the invention. Therefore, without limitation in this respect the invention is defined by the following claims.

I claim:

1. Apparatus to facilitate the handling of articles in a market comprising a check-out counter having a section with a flat top where articles are placed, a well in the counter adjacent said section and having an opening in the flat top, an elevator platform in said well, at least one side of the well being opened, bag storing and feeding means comprising a supporting structure below the top of the counter on which a stack of bags may be placed for maintaining a supply of bags adjacent the open side of well, said supporting structure comprising a base on which the bags are supported and side rails above the base, a pusher comprising a bar slidable on the rails at the rear of the stack of bags for advancing a stack of bags toward the opened side of the well, a spring motor at each end of the bar having a tape reel, the end of the tape reels being connected to the counter at opposite sides of the well to advance bags toward the well, detents engaging the sides of the foremost bag of the stack from which a bag may be pulled into the opened well and supported on the elevator platform in the well below the top of the counter, an electric circuit including a light and a switch actuated by the pusher as it approaches the opened side of the well to indicate when the supply of baks is nearly depleted, a door in the flat top of said counter overlying the bag supporting structure through which bags may be supplied to the base between the side rails, and manually controlled means for raising and lowering the elevator platform, whereby bags may be withdrawn from the bag storing and feeding means at the opened side of the well and opened on the platform when the latter is in its lowered position to adapt articles to be packed directly into the bags as they are checked by an attendant.

2. Apparatus to facilitate the handling of articles in a market comprising a check-out counter having a section with a flat top where articles are placed, a well in the counter adjacent said section and having an opening in the flat top, an elevator platform in said well, at least one side of the well being opened, bag storing and feeding means comprising a supporting structure below the top of the counter on which a stack of bags may be placed for maintaining a supply of bags adjacent the open side of the well, detents engaging the sides of the foremost bag of the stack from which a bag may be pulled into the well below the top of the counter, manually controlled means for raising and lowering the elevator platform whereby bags may be withdrawn from the bag storing and feeding means at the open side of the well and opened on the platform when the later is in its lowered position to adapt the articles to be packed directly into the bags as they are checked by an attendant, automatic bag opening means comprising movable rods, a head on each rod movable toward the bag in the open side of the well, means on said head for gripping the side of a bag, and means for reciprocating said rods to engage the heads with a bag, withdraw a bag from the detents and open the bag in the well.

3. A check-out counter in accordance with claim 2 in which the rods and heads are mounted on a reciprocating member for simultaneous movement toward and away from the bag in the open side of the well, and manually operated control means for reciprocating said member to automatically withdraw and open a bag in the well.

4. A check-out counter in accordance with claim 3 in which the manually operated control means is an electric solenoid and an electric circuit for the solenoid.

References Cited in the file of this patent
UNITED STATES PATENTS

| | | |
|---|---|---|
| 467,096 | Harper | Jan. 12, 1892 |
| 556,435 | Parkinson et al. | Mar. 17, 1896 |
| 1,800,657 | Pelletier | Apr. 14, 1931 |
| 2,273,644 | Hope | Feb. 17, 1942 |
| 2,582,381 | Higginbottom | Jan. 15, 1952 |
| 2,808,127 | Wesberry | Oct. 1, 1957 |
| 2,909,020 | Mersky | Oct. 20, 1959 |